United States Patent [19]

Moser

[11] 4,110,221

[45] Aug. 29, 1978

[54] LIQUID FILTRATION DEVICE

[75] Inventor: Fernand Moser, Corgemont, Switzerland

[73] Assignee: Louis Moser, Switzerland

[21] Appl. No.: 785,222

[22] Filed: Apr. 6, 1977

[30] Foreign Application Priority Data

Apr. 12, 1976 [CH] Switzerland .................. 4604/76

[51] Int. Cl.² ............................................. B01D 23/00
[52] U.S. Cl. ................................. 210/481; 99/302 R
[58] Field of Search ............... 210/162, 473, 474, 479, 210/481; 99/292, 295, 300, 302 R, 302 P, 306; 209/105

[56] References Cited

U.S. PATENT DOCUMENTS

| 99,840 | 2/1870 | Burrough | 209/105 |
|---|---|---|---|
| 759,811 | 5/1904 | Graham | 209/105 |
| 1,679,372 | 8/1928 | Pease | 209/105 X |
| 2,370,674 | 3/1945 | Lucia | 210/481 |
| 2,392,656 | 1/1946 | Foster | 99/292 X |

Primary Examiner—William A. Cuchlinski, Jr.
Attorney, Agent, or Firm—Robert E. Burns; Emmanuel J. Lobato; Bruce L. Adams

[57] ABSTRACT

A filter, mainly for coffee-making devices, comprises a cup-shaped cylindrical member and a circular member partially closing the top aperture of the cup-shaped cylindrical member so as to leave a filter-forming circular gap therebetween. This gap increases in width from the inner edge of the cup-shaped member inwards; the top face of the circular member may constitute the bottom of the filtration chamber. Means may be provided for adjusting the relative spacing of these members and therefore the width of the filter-forming gap. Ribs or shims may be provided on either of the two members for maintaining a permanent gap width.

9 Claims, 5 Drawing Figures

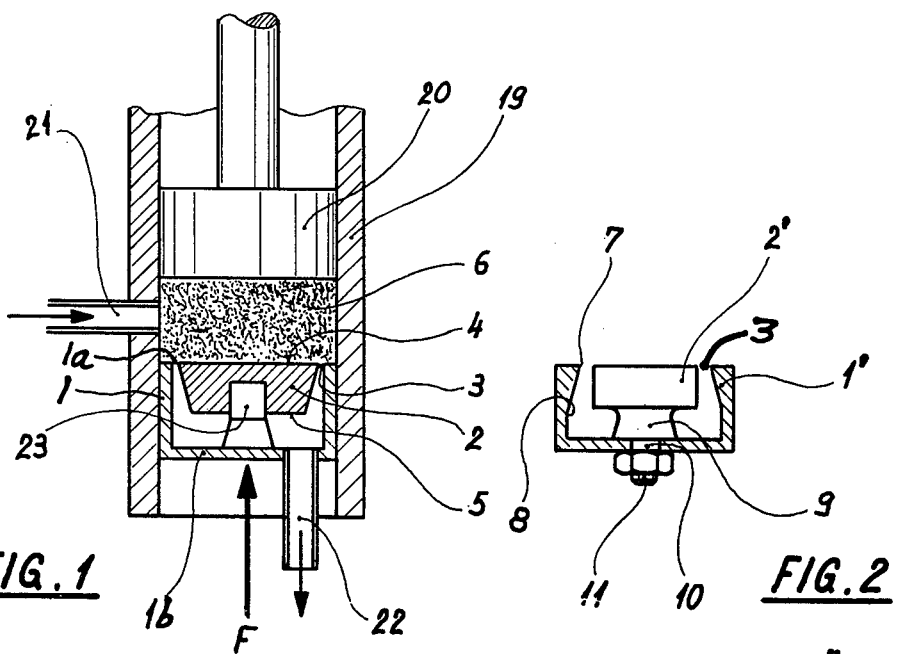
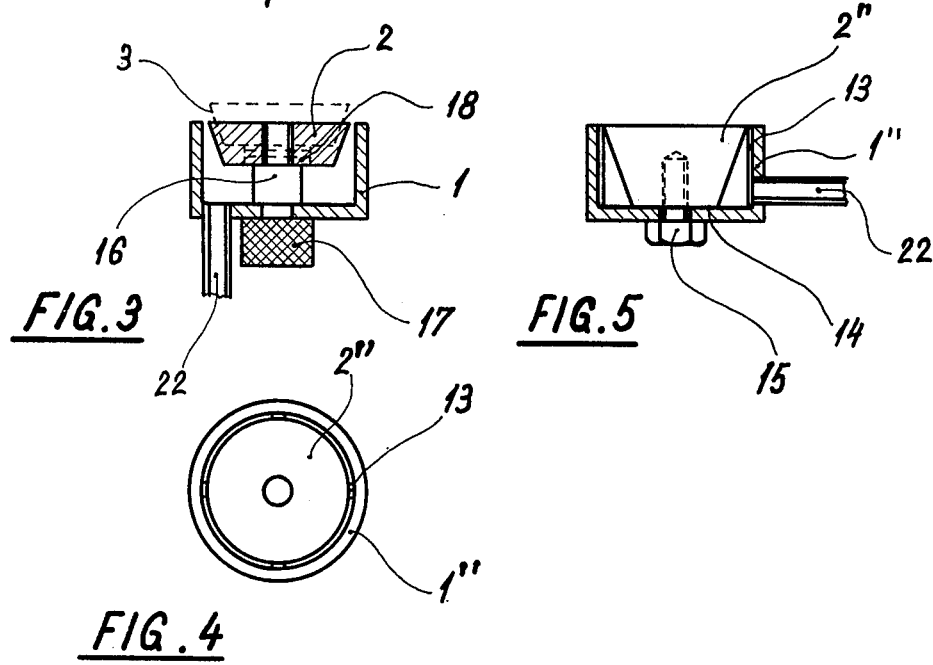

LIQUID FILTRATION DEVICE

BACKGROUND OF THE INVENTION

The present invention relates to a liquid filtration device of the type adapted to separate a liquid from solid particles, and is applicable notably to the filtration of a coffee infusion either in a household coffee machine or in a percolator.

Metal filters either in the form of perforated discs with or without raised edge, or in the form of a bell, are already known. Since the holes of these filters are extremely small, of the order of 0.15 to 0.2 mm, they clog inevitably. In this case, the only solution consists in clearing the hundreds of holes one by one with a pin.

In percolators pertaining to the pressure filter type filtration occurs under a certain pressure and the filter medium must have an adequate strength, and therefore a minimum thickness. To avoid any increment in the risk of clogging, it is known to flare the orifices out in the direction of flow. But also in this case the holes clog up rapidly as in thin filters.

SUMMARY OF THE INVENTION

It is the essential object of the present invention to provide a filtration device for liquids which is based on a different principle consisting in substituting one or several slots for the conventional orifices.

This device consists in juxtaposing at least two members so as to provide therebetween at least one slot of a width corresponding to the order of magnitude of the solid particles to be filtered, said slot flaring out in the direction of flow of the liquid.

BRIEF DESCRIPTION OF THE DRAWINGS

FIG. 1 illustrates in vertical axial section the filter device according to a preferred embodiment of the invention, inserted in a percolator;

FIG. 2 illustrates in axial section a modified embodiment of the two filter-forming members;

FIG. 3 is a view similar to FIG. 2 but showing means for adjusting the relative position of the two members; and FIGS. 4 and 5 illustrate in plan view from above and in vertical axial section, respectively, ribs or shims for centering the two members in relation to each other.

DESCRIPTION OF THE PREFERRED EMBODIMENTS

Referring to FIG. 1, it will be seen that a first member 1 consists of a cup or inverted bell-shaped cylindrical body having its top aperture partially closed by another member 2 of substantially frustoconical configuration, generally disposed in the cup 1 so as to leave a gap 3, the major and upwardly facing, upper base of this member 2 constituting and inner wall and particularly shown the bottom of the filtration chamber 6 and being, as shown, approximately flush with the upper, inner edge 1a of cup 1. The partial closure or valve member 2 has a minor, lower base 5 adjacent to and opposite the bottom 1b of the cup 1. Base 5 is formed with a blind hole engaged by a fitting member or support 23 centered with precision in the bottom of the first, cup-shaped member 1. This cup-shaped member 1 further comprises a tube 22 extending through its bottom to permit the escape of filtered liquid, for example coffee or another infusion to the outside. FIG. 1 also shows how the filter device of this invention can be adapted to a percolator, since the cup-shaped body or member 1 may act as a piston slidably fitted in the bore of a cylinder 19 and movable under the control of suitable actuating means, designated only diagrammatically by the arrow F, for compressing the ground coffee in the filtration chamber 6 against another piston 20, hot water being injected through another pipe 21. By properly moving the pistons 1 and 20, the coffee-grounds are expelled when necessary, after the coffee has filtered through the slot 3.

FIG. 2 shows a modified embodiment in which the valve-like member constitutes a kind of short cylinder 2' provided with a shouldered base 9, a centering shank 10, and a screw-threaded extension 11 of this shank adapted to be engaged by a nut. The hollow or cup-shaped member 1' has a cylindrical outer and frustoconical inner configuration with a concentric bore increasing in diameter from the upper, inner edge 7 inwards, down a level designated by the reference numeral 8, so that the width of the slot 3 formed between the cup 1 and cylinder 2 increases outwardly and downwardly, as shown.

FIG. 3 illustrates how the relative positions of members 1 and 2 may be modified by means of a modified support for the valve member 2. Instead of the support 23 of FIG. 1, this embodiment uses a support 16 having an upwardly facing shoulder; supporting, below the member 2, a suitable number of washers 18 in order to permit a convenient adjustment of the width of slot 3 and therefore the fineness of the filtration. In this case the support 16 and thereby the frustoconical member 2 is secured to the bottom of cup-shaped member 1 by means of a knurled nut 17.

FIGS. 4 and 5 illustrate in plan view and in section respectively a modified embodiment in which the width of slot 3 is maintained by means of ribs or shims 13, integral with cup 1.

In this modified embodiment the frustoconical member 2" bears directly with its minor base 14 on the bottom of the cup-shaped member 1. The two members are assembled by means of a screw 15, the relative centering being provided for by the aforesaid ribs or shims 13.

Of course, the filtration device according to this invention can be operated both vertically, as shown in the drawing, and horizontally; in this last case, the infusion outlet tube 22 is disposed radially, as illustrated in FIG. 5.

The frustoconical member and cup-shaped members illustrated in the drawing are solid members machined or cast integrally; however, other manufacturing methods may be used such as stamping, embossing, punching or injection moulding (in the case of cast-iron).

A possible improvement, notably when the filter of this invention is intended for a percolator, consists in providing suitable means for causing a relative movement between the two members 1 and 2 in order to release any solid particles likely to adhere to the edges of the slot 3.

It will readily occur to those conversant with the art that various modifications and changes may be brought to the filter described and illustrated herein without departing from the basic principle of the invention.

What is claimed is:

1. A coffee filter, comprising; a cup-shaped member having a bottom, a bottom outlet for coffee, a wall upstanding from the bottom, and an inner edge on the wall, remote from the bottom, defining an aperture, the cup-shaped member being, in use, insertable in a coffee-making device with slidable engagement of the wall with an inner surface of the device to define a chamber for particles of ground coffee by said inner surface above said edge, and with an inlet for water to said chamber; and a circular member generally disposed in the aperture to generally close it, the circular member having an upper, outer edge to define a slot-like gap between the outer and inner edges for filtering a liquid through the slot to the bottom outlet to separate the liquid from particles of ground coffee contained therein; one of the members having wall surface of a generally frusto-conical configuration disposed opposite a wall surface of the other member so that the surfaces diverge from one another from the slot-like gap toward the bottom of the cup-shaped member, and so that the slot-like gap has a width defining a size of solid particles to be filtered through the gap.

2. A filter according to claim 1, wherein the circular member has a top surface approximately flush with the edge of the cup-shaped member.

3. A filter according to claim 1, wherein the cup-shaped member is a hollow cylinder, and said surface of the circular member has the frustoconical configuration.

4. A filter according to claim 1, wherein said surface of the cup-shaped member has the frusto-conical configuration, the circular member being a solid cylinder.

5. A filter according to claim 1, in which one of the members comprises means for axially adjusting relative positions of the members, and for thereby adjusting the width of the slot-like gap to adjust the size of the particles of ground coffee filtered through the gap.

6. A filter according to claim 1, having ribs integral with one of the members, for controlling the width of the slot-like gap.

7. A filter according to claim 1, having a support for the circular member, secured to the bottom of the cup-shaped member; and having shim inserts between the support and the circular member for controlling the width of the slot-like gap.

8. A filter according to claim 1, having means for moving the cup-shaped and circular members in relation to each other for releasing from the slot-like gap any solid particles retained thereby.

9. A filter according to claim 8, wherein the cup-shaped member is a piston and is, in use, movably disposed for the releasing of the retained solid particles.

* * * * *